UNITED STATES PATENT OFFICE.

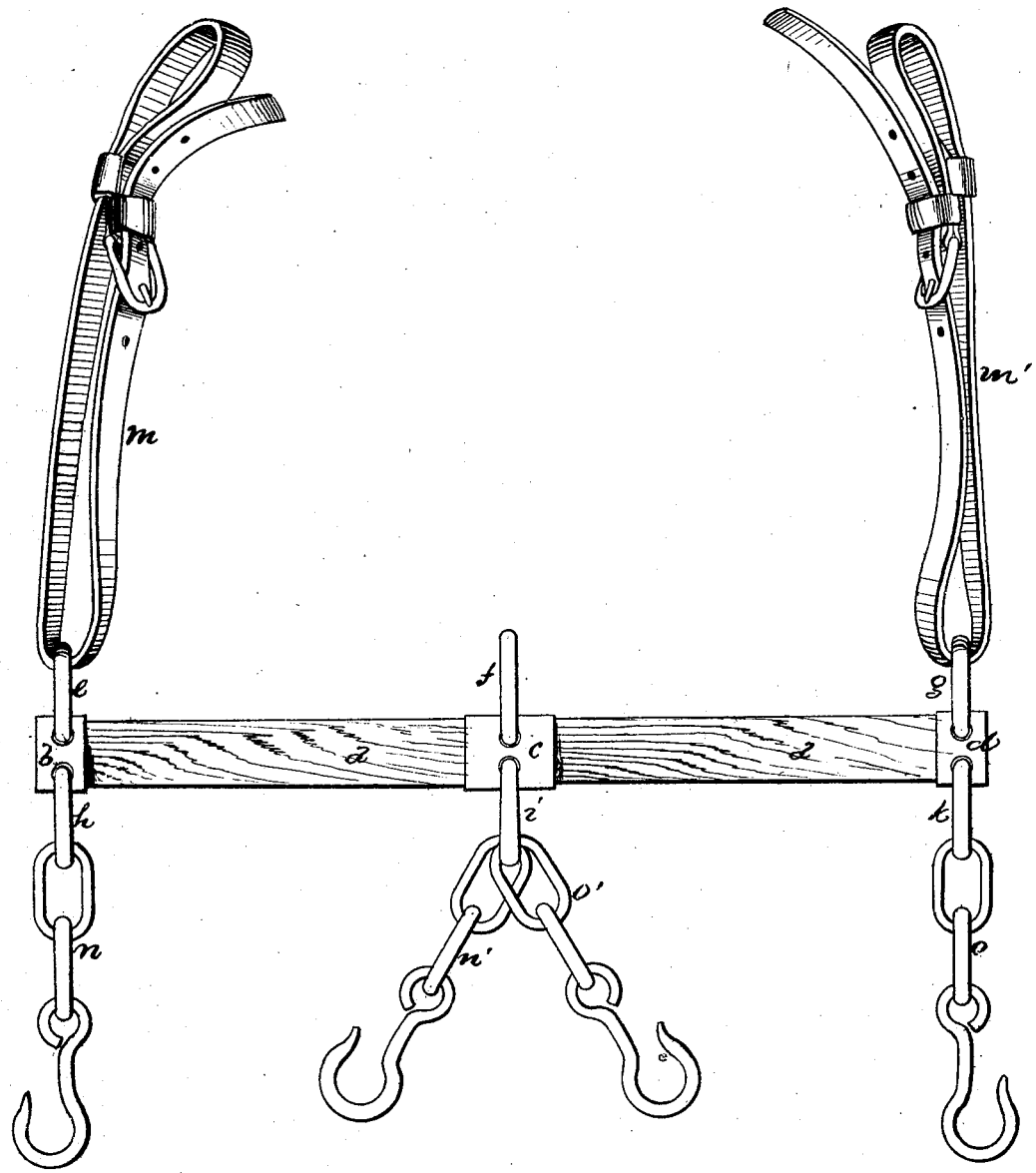

DANIEL S. SLOAN, OF ROCKVILLE, CONNECTICUT, ASSIGNOR TO J. H. LEWIS, L. S. LEWIS, AND A. D. WEST, OF SAME PLACE.

IMPROVEMENT IN WHIFFLETREES.

Specification forming part of Letters Patent No. 144,873, dated November 25, 1873; application filed March 8, 1873.

*To all whom it may concern:*

Be it known that I, DANIEL S. SLOAN, of Rockville, in the county of Tolland and State of Connecticut, have invented certain new and useful Improvements in Double Whiffletrees, of which the following is a specification, reference being had to the accompanying drawing, which is a view of the whiffletree and the means made use of to attach it to the harness of the horses.

This whiffletree is for two horses, for use in plowing or other draft work.

The letter $a$ indicates the main bar of the whiffletree, which may well be of wood. It is banded at the center and ends by the iron bands $b\ c\ d$. On one side of the bar are the three clevises $e\ f\ g$, and on the other the three clevises $h\ i\ k$. To the two clevises $e$ and $g$ are attached the straps $m$ and $m'$, and to the clevises $h$, $i$, and $k$ are attached the chains $n\ n'\ o\ o'$, each having a hook at its end. The whiffletree hangs under the bellies of the horses. The hooks $n$ and $n'$ are hooked into the large buckles of the harness of one of the horses, upon either side of him, and the hooks of the chains $o$ and $o'$ are similarly hooked into the large buckles of the harness of the other horse. By the expression "large buckles" I mean those buckles into which the tugs or draw-straps of the harness are commonly attached, and such draw-straps may well be removed when using this whiffletree. The straps $m$ and $m'$ are hitched into the large breech-rings near the after part of the harness. The draft-chain of the plow is hooked into the clevis $f$.

It is obvious that this whiffletree has a great advantage over the common whiffletree. The common whiffletree is always dangling at the heels of the horse, and needs a great deal of attention; while this whiffletree hangs steadily in one place, and needs no attention at all.

I claim as my invention—

The double whiffletree-bar $a$, provided with the straps $m\ m'$, the chains $n\ n'\ o\ o'$, and the clevis $f$, the whole constructed, combined, and arranged for operation and use substantially as described.

DANIEL S. SLOAN.

Witnesses:
GEO. TALCOTT,
LEBBEUS BISSELL.